UNITED STATES PATENT OFFICE.

RICHARD A. TILGHMAN, OF PHILADELPHIA, PENNSYLVANIA.

IMPROVEMENT IN THE MANUFACTURE OF ALKALINE CHROMATES.

Specification forming part of Letters Patent No. 5,897, dated October 31, 1848.

*To all whom it may concern:*

Be it known that I, RICHARD ALBERT TILGHMAN, of Philadelphia, in the State of Pennsylvania, have invented a new and useful improvement called "An Improvement in the Manufacture of the Chromates of the Alkalies and Alkaline Earths," of which the following is a full and exact description.

In the common processes for the manufacture of the alkaline chromates the salts which are usually employed are such as are either alkaline themselves, as the carbonates of potash and soda, or are capable of becoming alkaline by the heat of the operation, as the nitrates of potash and soda.

My invention consists in using as the source of the alkali in the manufacture of the chromates certain salts which contain the alkali, in combination with an acid so powerful as not to be destroyed by heat, but which, by the use of certain substances to combine with or carry off their acids, will leave the alkali free to unite with the chromic acid produced by the chrome ore. The salts which I employ are the sulphates and muriates of potash and soda, the silicate of potash, and the sulphates and muriates of baryta and strontia. The substances which I employ to combine with or carry off the respective acids of the several salts are steam and lime in the case of the sulphates and muriates of potash and soda, lime in the case of the silicate of potash, and steam in that of the sulphates and muriates of baryta and strontia. When the sulphate or muriate of potash or of soda is to be used I mix intimately one part, by weight, of chrome ore with two parts of the sulphate or muriate and two parts of lime, all in fine powder, and expose the mixture to a red heat for eighteen or twenty hours on the hearth of a reverberatory furnace, while currents of heated steam are thrown upon its surface from pipes coming through the roof of the furnace.

The atmosphere in the furnace must always be kept in an oxidizing state by the admission of a sufficient quantity of air through openings above the level of the fuel, and the charge should be frequently stirred to expose fresh surfaces to the steam and air.

The lime is not absolutely required in the above mixture, as chromate will be produced by the action, at a high temperature of steam, upon a mixture of chrome ore and the sulphate or muriate of potash or of soda alone; but I prefer to add the lime, as it aids the action by combining with the impurities of the ore, and also renders the charge more porous.

It is already known that chromate can be produced by heating together chrome ore, sulphate of potash or of soda, and lime without the use of steam, in which case the sulphuric acid of the sulphate forms a combination with the lime troublesome in the subsequent extraction of the soluble chromate; but when steam is employed, as above directed, this acid is volatilized and carried off during the calcination. When the charge is found by the usual tests to contain a sufficient quantity of the alkaline chromate it is withdrawn and the soluble parts extracted by water and treated in the usual way.

When the muriates of potash and soda are employed, as they are volatile at high heats, a portion of them will be carried off with the gases of the fire. When it is desired to avoid loss from this source the products of combustion should be passed through suitable condensers before escaping into the atmosphere.

To obtain chromate from the silicate of potash I use the natural double silicate of potash and alumina, or common potash feldspar, and I prefer that which contains the largest proportion of potash. One part, by weight, of chrome ore is intimately mixed with four parts of feldspar and four of lime, or an equivalent quantity of carbonate of lime, all in fine powder. The mixture is spread on the hearth of a reverberatory furnace and kept at a bright-red heat for eighteen or twenty hours, and stirred frequently, so that all parts may be equally exposed to heat and air. An oxidizing atmosphere is preserved by the admission of sufficient air into the furnace. The heat should not be permitted to rise high enough to cause even incipient fusion in the charge, which should be kept in a porous state. When an examination of the charge in the usual manner shows that it contains the proper quantity of alkaline chromate it is withdrawn from the furnace and lixiviated with water, as in the common process.

When I can procure a limestone sufficiently plastic to make a ball of the mixture hard enough to stand burning in a kiln without crushing and choking the draft I prefer that mode of calcination as more economical. For this purpose I use a kiln with separate lateral fires, so that the fuel is kept from touching the charge and yet the products of combustion pass through it. The materials, made up with water into balls of three or four inches in diameter and dried, are placed in the body of the kiln and withdrawn from below when sufficiently fired. As in the reverberatory furnace, care must be taken to preserve an oxidizing atmosphere and to prevent the charge from fusing by too high a heat.

To obtain the chromates of baryta and strontia from the sulphates or muriates of those bases I mix the chrome ore with double its weight of the sulphate or muriate, all in fine powder, and expose them on the hearth of a reverberatory furnace to a high heat and current of steam, as before described for the sulphate of potash. A high red heat will be found advantageous in treating the salts of baryta and strontia. The chromate of baryta or of strontia thus produced will be mixed with the residual undecomposed ore and sulphate or muriate, and may be used as a source of chromic acid.

I have thus fully described the nature of my said invention, but do not confine my claim to any particular form of apparatus or mode of working or proportion of ingredients; but I claim as of my invention—

1. Making the chromates of potash and soda by exposing a mixture of the sulphates or muriates of those alkalies, respectively, with chrome ore, and either with or without lime, at a red heat, to a current of steam and an oxidizing atmosphere. I do not claim making the chromates of potash and soda by heating together the sulphate of potash or soda, chrome ore, and lime without the use of steam.

2. Making the chromate of potash by heating to redness a mixture of a potash feldspar, lime or its carbonate, and chrome ore in an oxidizing atmosphere.

3. Making the chromates of baryta and strontia by exposing a mixture of the sulphates or muriates of those bases, respectively, with chrome ore at a high heat to a current of steam and an oxidizing atmosphere.

In testimony whereof I, the said RICHARD ALBERT TILGHMAN, hereto subscribe my name, in the presence of the witnesses whose names are hereto subscribed, on the 16th day of December, A. D. 1847.

RICHARD A. TILGHMAN.

Witnesses:
JOSEPH MARQUETTE,
WILLIAM EWING.